United States Patent
Yin et al.

(10) Patent No.: US 9,608,518 B2
(45) Date of Patent: Mar. 28, 2017

(54) POWER SUPPLY DEVICE AND CONTROL METHOD THEREOF

(71) Applicant: DELTA ELECTRONICS, INC., Taoyuan (TW)

(72) Inventors: Guo-Dong Yin, Taoyuan (TW); Ben Wu, Taoyuan (TW); Zhi-Wei Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 53 days.

(21) Appl. No.: 14/857,803

(22) Filed: Sep. 17, 2015

(65) Prior Publication Data

US 2016/0218618 A1    Jul. 28, 2016

(30) Foreign Application Priority Data

Jan. 27, 2015   (CN) .......................... 2015 1 0040507

(51) Int. Cl.
*H02M 3/155* (2006.01)
*H02M 3/28* (2006.01)
(Continued)

(52) U.S. Cl.
CPC ........... *H02M 3/155* (2013.01); *H02M 3/285* (2013.01); *H02M 3/33576* (2013.01); *H02M 2001/007* (2013.01)

(58) Field of Classification Search
CPC .. H02M 3/155; H02M 3/285; H02M 3/33576; H02M 2001/007
(Continued)

(56) References Cited

U.S. PATENT DOCUMENTS 4,174,534 A * 11/1979 Kotlarewsky ......... H02M 3/285
                                                        363/26
4,734,844 A *  3/1988 Rhoads ................... H02J 1/102
                                                        323/272
(Continued)

FOREIGN PATENT DOCUMENTS

CN          103178513 A      6/2013
TW          M463938 U       10/2013

OTHER PUBLICATIONS

Received search report from EIC 2800 STIC searcher Benjamin Martin on Sep. 20, 2016.*

*Primary Examiner* — Timothy J Dole
*Assistant Examiner* — Htet Z Kyaw
(74) *Attorney, Agent, or Firm* — CKC & Partners Co., Ltd.

(57) ABSTRACT

A power supply device includes a master power supply module, a slave power supply module and a control module. The master power supply module is configured to output a master output current and an output voltage according to a master control signal. The slave power supply module is electrically connected in parallel to the master power supply module and configured to output a slave output current and the output voltage according to a slave control signal. The control module is electrically connected to the master power supply module and the slave power supply module and configured to output the master control signal according to the output voltage, generate a current compensation signal according to the master output current and the slave output current, and output the slave control signal according to the output voltage and the current compensation signal which is based on the master output current.

20 Claims, 6 Drawing Sheets

(51) Int. Cl.
*H02M 3/335* (2006.01)
*H02M 1/00* (2006.01)

(58) Field of Classification Search
USPC .................................................. 323/272–366
See application file for complete search history.

(56) References Cited

U.S. PATENT DOCUMENTS

| | | | | |
|---|---|---|---|---|
| 5,672,958 A * | 9/1997 | Brown | .................. | G01R 31/40 307/53 |
| 5,740,023 A * | 4/1998 | Brooke | ................. | H02M 3/285 363/65 |
| 6,853,169 B2 * | 2/2005 | Burstein | ............. | H02M 3/1584 323/225 |
| 7,230,406 B2 * | 6/2007 | Huang | ................ | H02M 3/1584 323/222 |
| 7,570,036 B2 * | 8/2009 | Tang | .................. | H02M 3/1584 323/272 |
| 8,030,911 B2 * | 10/2011 | Nien | .................... | H02M 3/1584 323/272 |
| 8,120,204 B2 * | 2/2012 | Moon | ..................... | H02J 1/102 307/32 |
| 8,552,704 B2 * | 10/2013 | Kiadeh | ............... | H02M 3/1584 323/285 |
| 8,810,217 B2 * | 8/2014 | Malmberg | ............. | H02J 1/102 323/272 |
| 9,407,145 B1 * | 8/2016 | Burstein | ............. | H02M 3/1584 |
| 2010/0013307 A1 * | 1/2010 | Heineman | ................. | G06F 1/26 307/33 |
| 2013/0021009 A1 * | 1/2013 | Waltman | ............. | H02M 3/156 323/271 |
| 2013/0049467 A1 | 2/2013 | Yen et al. | | |
| 2013/0163297 A1 * | 6/2013 | Phadke | .................... | H02J 3/26 363/65 |
| 2014/0268947 A1 * | 9/2014 | Phadke | .................. | H02J 1/102 363/69 |

* cited by examiner

POWER SUPPLY DEVICE AND CONTROL METHOD THEREOF

RELATED APPLICATIONS

This application claims priority to China Application Serial Number 201510040507.4, filed Jan. 27, 2015, which is herein incorporated by reference.

BACKGROUND

1. Technical Field

The present disclosure relates to a power supply device, and in particular, to a power supply device with current equalization.

2. Description of Related Art

With the extensive use of power supplies in servers and in the field of communications, in order to achieve the requirements of high efficiency, high power density, high reliability, and low cost, more and more power supplies adopt a modular design for varying power levels by connecting different numbers of power modules in parallel.

However, when a power supply includes two or more power modules connected in parallel, the quality of the power supply will depend largely on whether the output currents of the power modules are equal. With existing current equalization approaches, such as the droop method and current control, multiple voltage loops or current loops are required to realize current equalization between power modules, and thus complexity and cost are increased. Therefore, an important area of research in the field involves ways to simplify the current equalization control method of power modules.

SUMMARY

To solve the problem stated above, one aspect of the present disclosure is a power supply device. The power supply device includes a master power supply module, a slave power supply module, and a control module. The master power supply module is configured to output a master output current and an output voltage according to a master control signal. The slave power supply module is electrically connected in parallel to the master power supply module and configured to output a slave output current and the output voltage according to a slave control signal. The control module is electrically connected to the master power supply module and the slave power supply module and configured to output the master control signal according to the output voltage, generate a current compensation signal according to the master output current and the slave output current, and output the slave control signal according to the output voltage and the current compensation signal, in which the current compensation signal is based on the master output current.

Another aspect of the present disclosure is a control method for a power supply device, in which the power supply device includes a master power supply module and a slave power supply module electrically connected in parallel. The control method includes controlling the master power supply module to output a master output current and an output voltage by a master control signal, and controlling the slave power supply module to output a slave output current and the output voltage by a slave control signal. The master control signal is generated according to the output voltage, the slave control signal is generated according to the output voltage and a current compensation signal, and the current compensation signal is generated according to the master output current and the slave output current.

Yet another aspect of the present disclosure is a power supply device. The power supply device includes a plurality of power supply modules and a control module. The power supply modules are electrically connected in parallel to each other and configured to output an output voltage, and each of the power supply modules is configured to output an output current, and adjust the output current according to a corresponding control signal. The control module is electrically connected to the power supply modules and configured to obtain an average reference current according to the output currents and generate a plurality of current compensation signals corresponding to the power supply modules based on the average reference current, and output the control signals corresponding to the power supply modules according to the output voltage and the current compensation signals to adjust the output currents of the power supply modules.

Yet another aspect of the present disclosure is a control method for a power supply device, in which the power supply device includes a plurality of power supply modules electrically connected in parallel and configured to output an output voltage. The control method includes sampling a plurality of output currents outputted by the power supply modules, and processing the output currents to obtain an average reference current; and obtaining a corresponding current compensation signal with respect to each power supply module based on the average reference current, and outputting a plurality of control signals corresponding to the power supply modules according to the output voltage and the corresponding current compensation signals.

In summary, technical solutions of the present disclosure have advantages and beneficial effects compared to present technical solutions. Such technical solutions of the present disclosure can be widely used in industry. In the present disclosure, by collecting the output currents of the power supply modules and adjusting the control signals after calculation in order to achieve the current equalization of the power supply modules, only one voltage loop may be required. As a consequence, the complexity of the control is simplified.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
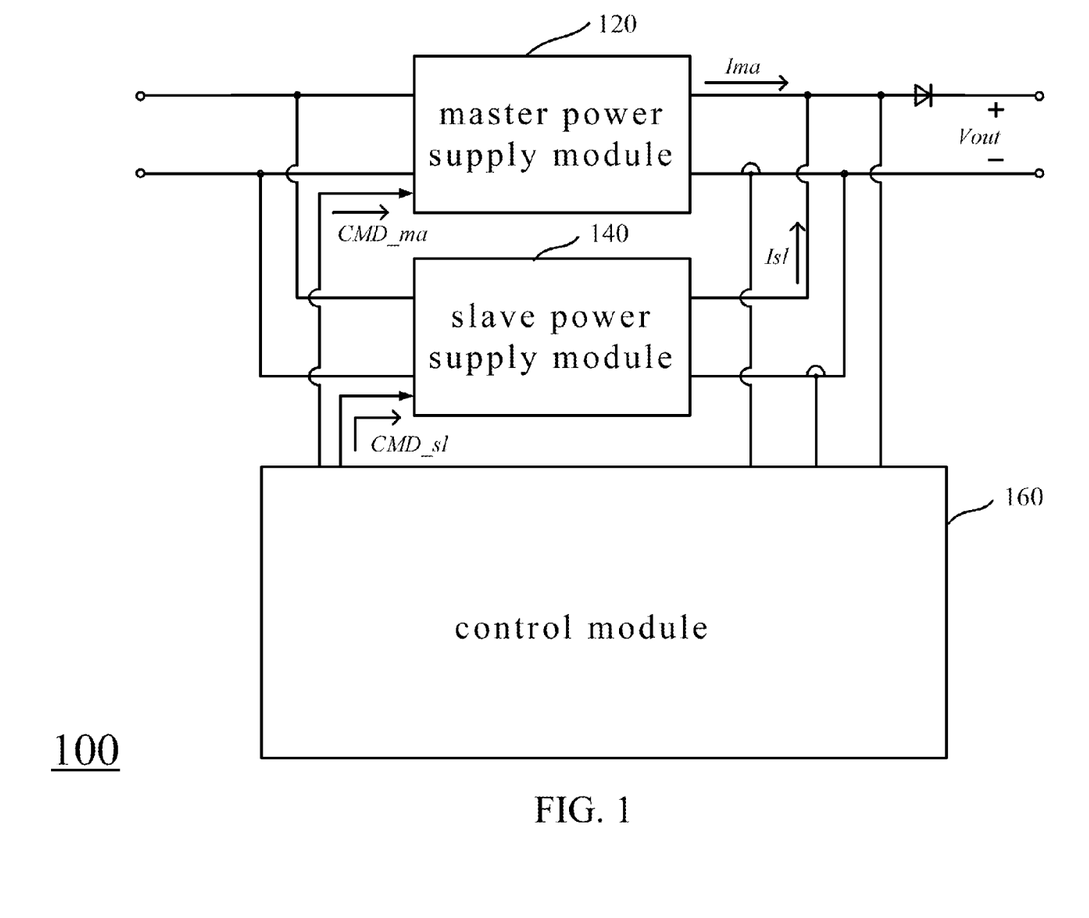
FIG. 1 is a schematic diagram illustrating a power supply device according to an embodiment of the present disclosure.

Reference is made to FIG. 1. FIG. 1 is a schematic diagram illustrating a power supply device according to an embodiment of the present disclosure. The power supply device 100 includes a master power supply module 120, a slave power supply module 140 and a control module 160. As shown in FIG. 1, the master power supply module 120 and the slave power supply module 140 are electrically connected in parallel, and the control module 160 is electrically connected to the master power supply module 120 and the slave power supply module 140.

In the present embodiment, the master power supply module 120 is configured to be controlled by a master control signal CMD_ma to output a master output current Ima. The slave power supply module 140 is configured to be controlled by a slave control signal CMD_sl to output a slave output current Isl. Because the master power supply module 120 and the slave power supply module 140 are electrically connected in parallel, the voltage outputted by both of the output terminals thereof are the output voltage Vout.

The control module 160 is configured to detect the output voltage Vout (i.e., the voltage outputted by the output terminals of the master power supply module 120 and the slave power supply module 140), and output the master control signal CMD_ma according to the output voltage Vout. In addition, the control module 160 is also configured to detect the master output current Ima and the slave output current Isl, and calculate a current compensation signal COM_I (shown in FIG. 2) by comparing the master output current Ima and the slave output current Isl, after which the control module 160 outputs the slave control signal CMD_sl according to the output voltage Vout and the current compensation signal COM_I.

The current compensation signal COM_I is based on the master output current Ima. Alternatively stated, in the present embodiment, when the control module 160 detects that the slave output current Isl is different from the master output current Ima, the control module 160 generates a corresponding current compensation signal COM_I and then outputs a corresponding slave control signal CMD_sl to adjust the slave output current Isl, such that the slave output current Isl is made more equal to the master output current Ima.

For example, in one embodiment, when the slave output current Isl is larger than the master output current Iam, the current compensation signal COM_I may be decreased. Due to the fact that the output signal of the voltage control loop, i.e., a voltage error signal ERR_V in the present embodiment, may be added to the current compensation signal COM_I, the sum thereof decreases accordingly, which means the slave control signal CMD_sl is adjusted to be decreased. When the slave power supply module 140 adopts a positive control logic as the control logic, the decreased slave control signal CMD_sl is configured to control the slave power supply module 140 to reduce the slave output current Isl. On the other hand, in this embodiment, when the slave output current Isl is smaller than the master output current Ima, the increased current compensation signal COM_I is configured to adjust the slave control signal CMD_sl to increase to thereby control the slave power supply module 140 to increase the slave output current Isl.

It is noted that though only one slave power supply module 140 is shown in the embodiment in FIG. 1, but the disclosure is not limited thereto, for example, the power supply device 100 may include a plurality of slave power supply modules 140. In this case, the control module 160 may be configured to generate corresponding current compensation signals COM_I and output corresponding slave control signals CMD_sl to adjust the slave output currents Isl outputted by each of the plurality of slave power supply module 140, such that the slave output currents Isl are made to be close to or equal to the master output current Ima outputted by the master power supply module 120.

Thus, via the detection of the master output current Ima, the slave output current Isl, and the output voltage Vout by the control module 160, the current information is added to the voltage control loop by a process of compensation, and the current equalization between the master power supply module 120 and the slave power supply module 140 is achieved.

Figure 2:
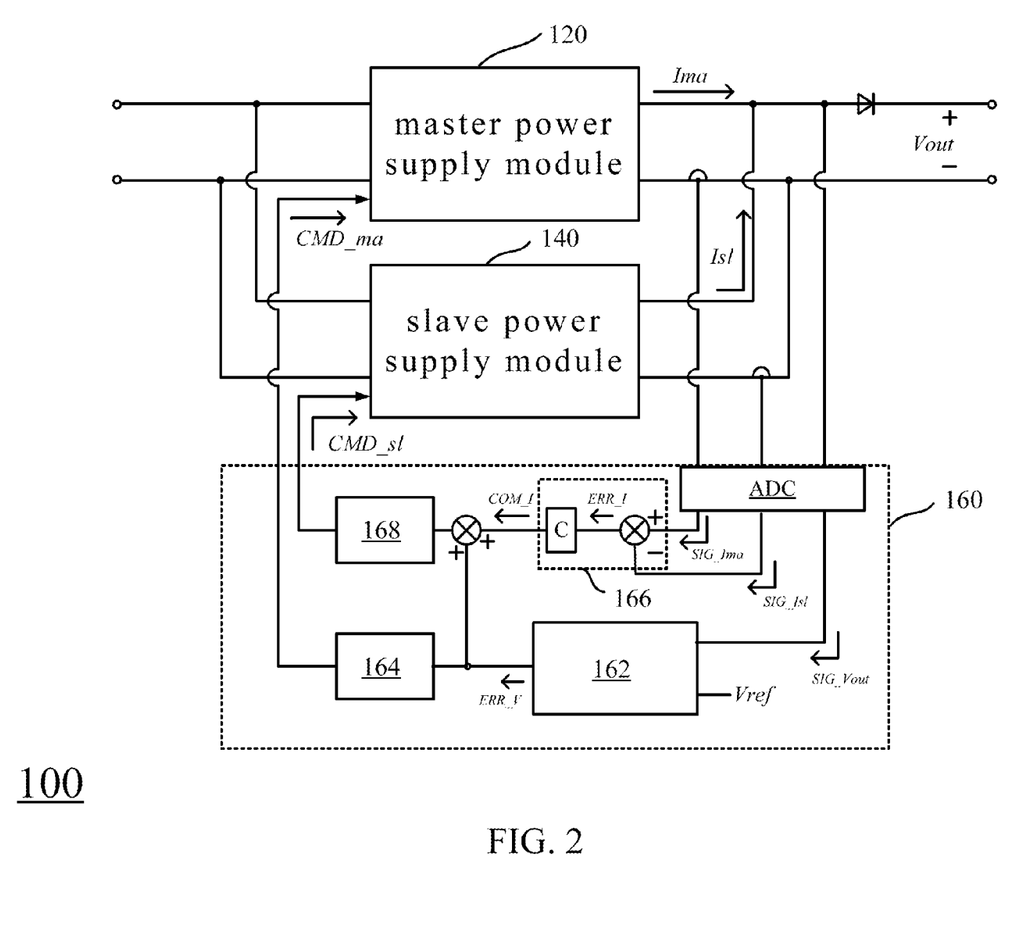
FIG. 2 is a schematic diagram illustrating a power supply device according to an embodiment of the present disclosure.

Specifically, the way the control module 160 outputs the master control signal CMD_ma and the slave control signal CMD_sl according to the detected master output current Ima, slave output current Isl and output voltage Vout is shown in FIG. 2.

Reference is made to FIG. 2. FIG. 2 is a schematic diagram illustrating a power supply device according to an embodiment of the present disclosure. In the present embodiment, the control module 160 includes a voltage comparison unit 162, a master control signal generator 164, a current comparison unit 166 and a slave control signal generator 168. The control module 160 may be realized using digital signal processors (DSP).

The voltage comparison unit 162 is configured to compare a feedback voltage signal SIG_Vout corresponding to the output voltage Vout and a reference voltage signal Vref to output a voltage error signal ERR_V. For example, the voltage comparison unit 162 may include a Proportional-Integral-Derivative controller (PID controller) and other signal processing parts, but the present disclosure is not limited thereto.

The master control signal generator 164 is electrically connected to the voltage comparison unit 162 and the master power supply module 120, and the master control signal generator 164 is configured to generate the master control signal CMD_ma according to the voltage error signal ERR_V. In the embodiment where the voltage comparison unit 162 includes a PID controller, the voltage feedback circuit may be configured such that the feedback voltage signal SIG_Vout corresponding to the output voltage Vout may be made to be close to or equal to the reference voltage signal Vref. Alternatively stated, the master control signal CMD_ma may be determined according to the output voltage Vout and the reference voltage signal Vref, and thus may be configured to adjust the output voltage Vout and the master output current Ima of the master power supply module 120.

The current comparison unit 166 is electrically connected to the master power supply module 120 and the slave power supply module 140, and configured to compare a master current sampling signal SIG_Ima corresponding to the master output current Ima and a slave current sampling signal SIG_Isl corresponding to the slave output current Isl to generate a current error signal ERR_I, and to further generate the current compensation signal COM_I according to the current error signal ERR_I. In one embodiment, the current compensation signal COM_I may be obtained by performing proportional transform, integral transform, proportional-integral transform, proportional-derivative transform, proportional-integral-derivative transform, etc., and may be obtained by digital scaling or adding/subtracting a constant. It is also possible to use the current error signal ERR_I directly as the current compensation signal COM_I without any processing, and the present disclosure is not limited thereto.

Specifically, in the present embodiment, the current comparison unit 166 may subtract the slave current sampling signal SIG_Isl from the master current sampling signal SIG_Ima to obtain a difference value, i.e., the current error signal ERR_I. In the present embodiment, the current error signal ERR_I may be positive to indicate that the master output current Ima is larger than the slave output current Isl. On the other hand, the current error signal ERR_I may be negative to indicate that the master output current Ima is smaller than the slave output current Isl. The current error signal ERR_I may further be multiplied by a ratio to obtain the current compensation signal COM_I, but the present disclosure is not limited thereto. The ratio may be adjusted according to actual needs, and in some embodiments, the current error signal ERR_I may be outputted directly as the current compensation signal COM_I without scaling or amplifying by the ratio. Alternatively stated, the value of the current error signal ERR_I and the value of the current compensation signal COM_I may be the same, and the present disclosure is not limited thereto.

The slave control signal generator 168 may be electrically connected to the voltage comparison unit 162, the current comparison unit 166, and the slave power supply module 140. The slave control signal generator 168 may be configured to generate the slave control signal CMD_sl according to the voltage error signal ERR_V and the current compensation signal COM_I. Compared to the master control signal CMD_ma, due to the fact that the slave control signal CMD_sl is not only based on the voltage error signal ERR_V, but also takes into consideration the current compensation signal COM_I which represents the difference between the master output current Ima and the slave output current Isl, the slave control signal CMD_sl may be adjusted properly according to the current compensation signal COM_I and provided to the slave power supply module 140 such that the slave power supply module 140 is configured to output the slave output current Isl in a manner that is close to or equal to the master output current Ima. Hence, current equalization between the master power supply module 120 and the slave power supply module 140 is achieved.

It is noted that, in some embodiments, the control module 160 may transform the received output voltage Vout, the master output current Ima, and the slave output current Isl via one or more analog to digital converters (ADC) to the corresponding feedback voltage signal SIG_Vout, the master current sampling signal SIG_Ima, and the slave current sampling signal SIG_Isl, but the present disclosure is not limited thereto, as long as the corresponding feedback signals indicate each of the physical quantities to be represented.

Figure 3:
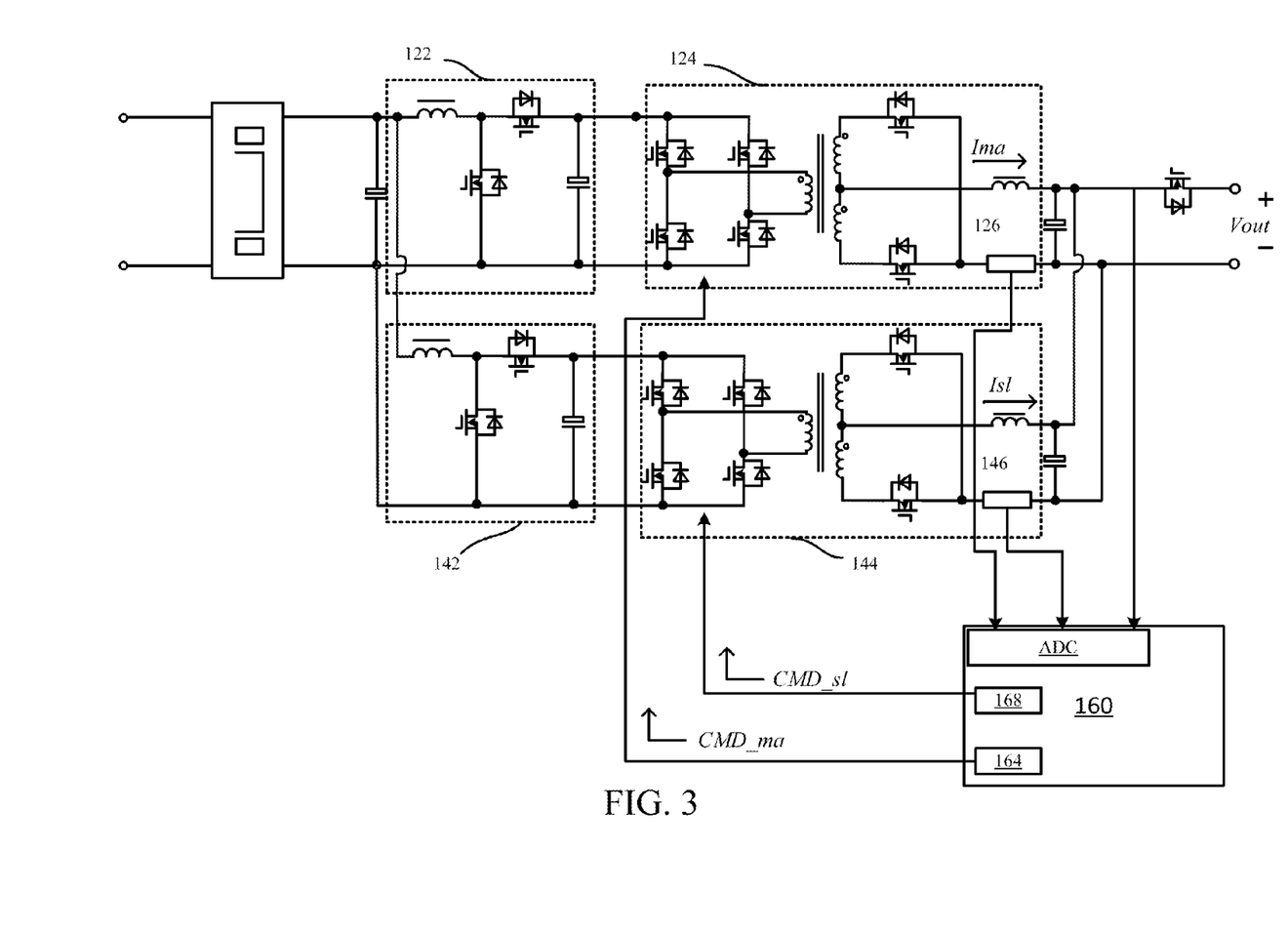
FIG. 3 is a schematic diagram illustrating a power supply device according to an embodiment of the present disclosure.

Reference is made to FIG. 3. FIG. 3 is a schematic diagram illustrating a power supply device according to an embodiment of the present disclosure. In the present embodiment, the master power supply module 120 and the slave power supply module 140 may both adopt a boost converter and a full-bridge DC-DC converter as the main topology. The master power supply module 120 includes a boost converter 122 and a full-bridge DC-DC converter 124, and the slave power supply module 140 includes a boost converter 142 and a full-bridge DC-DC converter 144, but the disclosure is not limited thereto.

The master control signal CMD_ma and the slave control signal CMD_sl may be pulse width modulation (PWM) signals, but the disclosure is not limited thereto. For example, in some embodiments, the master control signal CMD_ma and the slave control signal CMD_sl may be pulse frequency modulation (PFM) signals to thereby use pulse frequency modulation to achieve control of the master control signal CMD_ma and the slave control signal CMD_sl. In the embodiment which adopts pulse frequency modulation, when the slave output current Isl is larger than the master output current Ima, the current compensation signal COM_I correspondingly adjusts the frequency of the slave control signal CMD_sl to reduce the slave output current Isl. In the embodiment which adopts pulse width modulation, when the slave output current Isl is larger than the master output current Ima, the current compensation signal COM_I correspondingly adjusts the duty cycle of the slave control signal CMD_sl to reduce the slave output current Isl.

On the other hand, when the slave output current Isl is smaller than the master output current Ima, in the embodiment which adopts pulse width modulation, the current compensation signal COM_I correspondingly adjusts the duty cycle of the slave control signal CMD_sl to increase the slave output current Isl. In the embodiment which adopts pulse frequency modulation, the current compensation signal COM_I correspondingly adjusts the frequency of the slave control signal CMD_sl to increase the slave output current Isl. The master control signal CMD_ma and the slave control signal CMD_sl may be configured to control switches in the full-bridge DC-DC converter 124, 144 respectively, to achieve the effect of adjusting the master output current Ima and the slave output current Isl.

It is noted that the boost converter 122, 142 and the full-bridge DC-DC converter 124, 144 may be designed according to actual needs. FIG. 3 is an example of a possible implementation and is not meant to limit the present disclosure.

Figure 4:
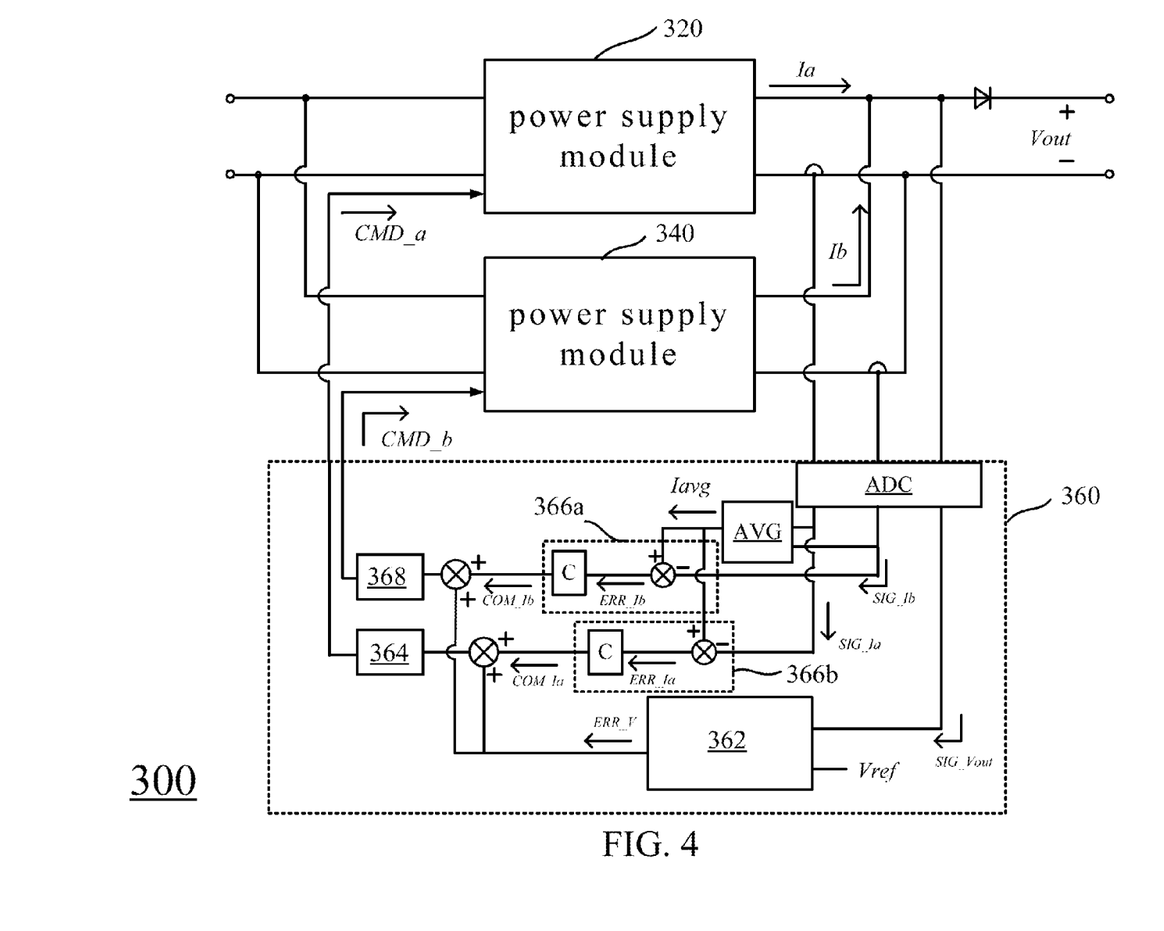
FIG. 4 is a schematic diagram illustrating a power supply device according to an embodiment of the present disclosure.

Reference is made to FIG. 4. FIG. 4 is a schematic diagram illustrating a power supply device according to an embodiment of the present disclosure. In the present embodiment, the power supply module 300 includes a plurality of power supply modules 320, 340 electrically connected in parallel to each other, and a control module 360 electrically connected to the power supply modules 320, 340, The power supply modules 320, 340 are configured to output the output voltage Vout, and the power supply modules 320 and 340 are configured to output currents Ia and Ib respectively and adjust the output currents Ia and Ib according to control signals CMD_a and CMD_b respectively.

The control module 360 is configured to receive the output currents Ia and Ib outputted by the power supply modules 320 and 340, and obtain an average reference current Iavg according to the output currents Ia and Ib, and generate current compensation signals COM_Ia and COM_Ib corresponding to the power supply modules 320 and 340 respectively based on the average reference current Iavg.

The control module 360 is configured to output the control signals CMD_a and CMD_b to the power supply modules 320 and 340 respectively according to the output voltage Vout and the current compensation signals COM_Ia and COM_Ib to adjust the output currents Ia and Ib of the power supply modules 320 and 340. Thus, the current equalization between multiple power supply modules 320 and 340 is achieved.

For example, when the output current of any one of the power supply modules (e.g., the output current Ia of the power supply module 320) is larger than the average reference current Iavg, the corresponding current compensation signal COM_Ia is configured to adjust the corresponding control signal CMD_a to reduce the output current Ia of the power supply module 320. On the other hand, when the output current of any one of the power supply modules (e.g., the output current Ib of the power supply module 340) is smaller than the average reference current Iavg, the current compensation signal COM_b is configured to adjust the corresponding control signal CMD_b to increase the output current Ib of the power supply module 340.

The difference between the power supply device 300 and the power supply device 100 shown in the embodiment of FIG. 2 is that, in the present embodiment, the power supply modules 320 and 340 of the power supply device 300 are not separated into a master power supply device and a slave power supply device, and the output currents Ia and Ib of the power supply modules 320 and 340 are adjusted based on the average value of the output currents. Alternatively stated, in the embodiment including two power supply modules, the power supply modules 320 and 340 are both configured to adjust the output currents Ia and Ib respectively to achieve current equalization. In some embodiments, the power supply device 300 may include more than two power supply modules, and each power supply module may be configured to adjust the output current thereof to achieve current equalization.

As shown in FIG. 4, in one embodiment, the control module 360 of the power supply device 300 includes a voltage comparison unit 362, an average current calculating unit AVG, a plurality of current comparison units 366a and 366b, and a plurality of control signal generators 364 and 368.

The average current calculating unit AVG is electrically connected to the power supply modules 320 and 340. The current comparison units 366a and 366b are electrically connected to the average current calculating unit AVG. The control signal generators 364 and 368 are electrically connected to the voltage comparison unit 362, respectively to the current comparison units 366b and 366a, and respectively to the power supply modules 320 and 340.

The voltage comparison unit 362 is configured to compare the feedback voltage signal SIG_Vout corresponding to the output voltage Vout and the reference voltage signal Vref to output the voltage error signal ERR_V. The detailed description of the voltage comparison unit 362 is similar to that for the voltage comparison unit 162 in the aforementioned embodiments, and since this has been clearly described in the above paragraphs, it will be omitted herein for the sake of the brevity.

The average current calculating unit AVG is configured to receive current sampling signals SIG_Ia and SIG_Ib corresponding to the output currents Ia and Ib respectively to generate the average reference current Iavg after performing calculations.

The current comparison units 366a and 366b are configured to compare the current sampling signals SIG_Ia and SIG_Ib respectively with the average reference current Iavg to output current error signals ERR_Ia and ERR_Ib respectively.

In the present embodiment, the current error signals ERR_Ia and ERR_Ib may further be multiplied by a ratio to obtain the current compensation signals COM_Ia and COM_Ib. The ratio may be adjusted according to actual needs, and in some embodiments, the current error signals ERR_Ia and ERR_Ib may be outputted directly as the current compensation signals COM_Ia and COM_Ib without scaling or amplifying by the ratio. Alternatively stated, the values of the current error signals ERR_Ia and ERR_Ib and the values of the current compensation signals COM_Ia and COM_Ib may be the same respectively, and the present disclosure is not limited thereto.

Alternatively stated, in the embodiment shown in FIG. 2, the current comparison unit 166 is configured to compare the master current sampling signal SIG_Ima and the slave current sampling signal SIG_Isl such that the current error signal ERR_I may indicate the difference. On the other hand, the current comparison units 366a and 366b in the present embodiment are configured to compare the current sampling signals SIG_Ia, SIG_Ib respectively with the average reference current Iavg, such that the current error signal ERR_Ia, ERR_Ib may indicate the difference respectively, and therefore, the power supply modules are not distinguished by a master and slave relationship in the present disclosure.

Except for the difference highlighted above, the specific operations of the current comparison units 366a and 366b are similar to the operation of the current comparison unit 166 in the aforementioned embodiments, and since this has been clearly described in the above paragraphs, it will be omitted herein for the sake of the brevity.

The control signal generators 364 and 368 are configured to output the control signals CMD_a and CMD_b respectively according to the voltage error signal ERR_V and the current compensation signals COM_Ia and COM_Ib respectively. The specific operations of the control signal generators 364 and 368 are similar to the operation of the slave control signal generator 168 in the aforementioned embodiments, and since this has been clearly described in the above paragraphs, it will be omitted herein for the sake of the brevity.

Similar to the embodiment shown in FIG. 3, the control signals CMD_a and CMD_b of the power supply device 300 in the present disclosure may be pulse width modulation signals (PWM signals) respectively, which are configured to control the switches in the power supply module 320 and 340 to adjust the output voltage Vout, and to adjust the output current Ia and Ib outputted by the power supply modules 320 and 340 respectively, but the disclosure is not limited thereto. Similarly, in some embodiments, the control signals CMD_a and CMD_b may also be pulse frequency modulation (PFM) signals, which using pulse frequency modulation to achieve the control of the control signals CMD_a and CMD_b. The power supply device 300 achieves the current equalization between each power supply module through operations in which the power supply modules are not distinguished by a master and slave relationship in the present disclosure.

Figure 5:
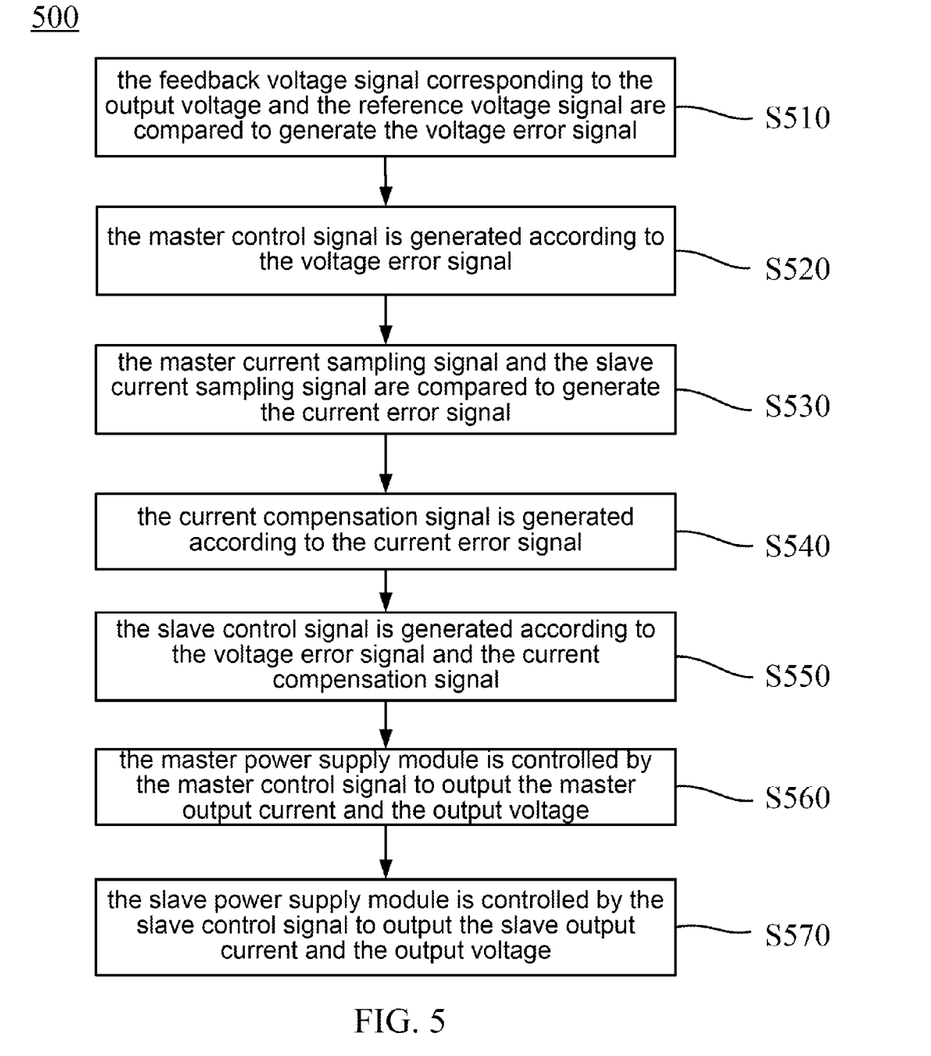
FIG. 5 is a flow chart illustrating a control method according to an embodiment of the present disclosure.

Another aspect of the present disclosure is a control method for a power supply device. Reference is made to FIG. 5. FIG. 5 is a flow chart illustrating a control method 500 according to an embodiment of the present disclosure. For convenience and to facilitate a clear description, the embodiment shown in FIG. 2 is taken as an example to describe the method below, but this is not meant to limit the present disclosure.

The control method 500 includes steps S510, S520, S530, S540, S550, S560, and S570. First, in step S510, the feedback voltage signal SIG_Vout corresponding to the output voltage Vout and the reference voltage signal Vref are compared to generate the voltage error signal ERR_V. In step S520, the master control signal CMD_ma is generated according to the voltage error signal ERR_V. In step S530, the master current sampling signal SIG_Ima corresponding to the master output current Ima and the slave current sampling signal SIG_Isl corresponding to the slave output current Isl are compared to generate the current error signal ERR_I.

In step S540, the current compensation signal COM_I is generated according to the current error signal ERR_I. In some embodiments, the current error signals ERR_I may be outputted directly as the current compensation signals COM_I to achieve this step without undergoing any changes or without performing any processes. Next, in step S550, the slave control signal CMD_sl is generated according to the voltage error signal ERR_V and the current compensation signal COM_I. Finally, in step S560, the master power supply module 120 is controlled by the master control signal CMD_ma to output the master output current Ima and the output voltage Vout. In step S570, the slave power supply module 140 is controlled by the slave control signal CMD_sl to output the slave output current Isl and the output voltage Vout.

Since those skilled in the art would be capable of immediately understanding how to perform the operations and functions of the method based on the power supply device 100 in the embodiments described above, a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

Figure 6:
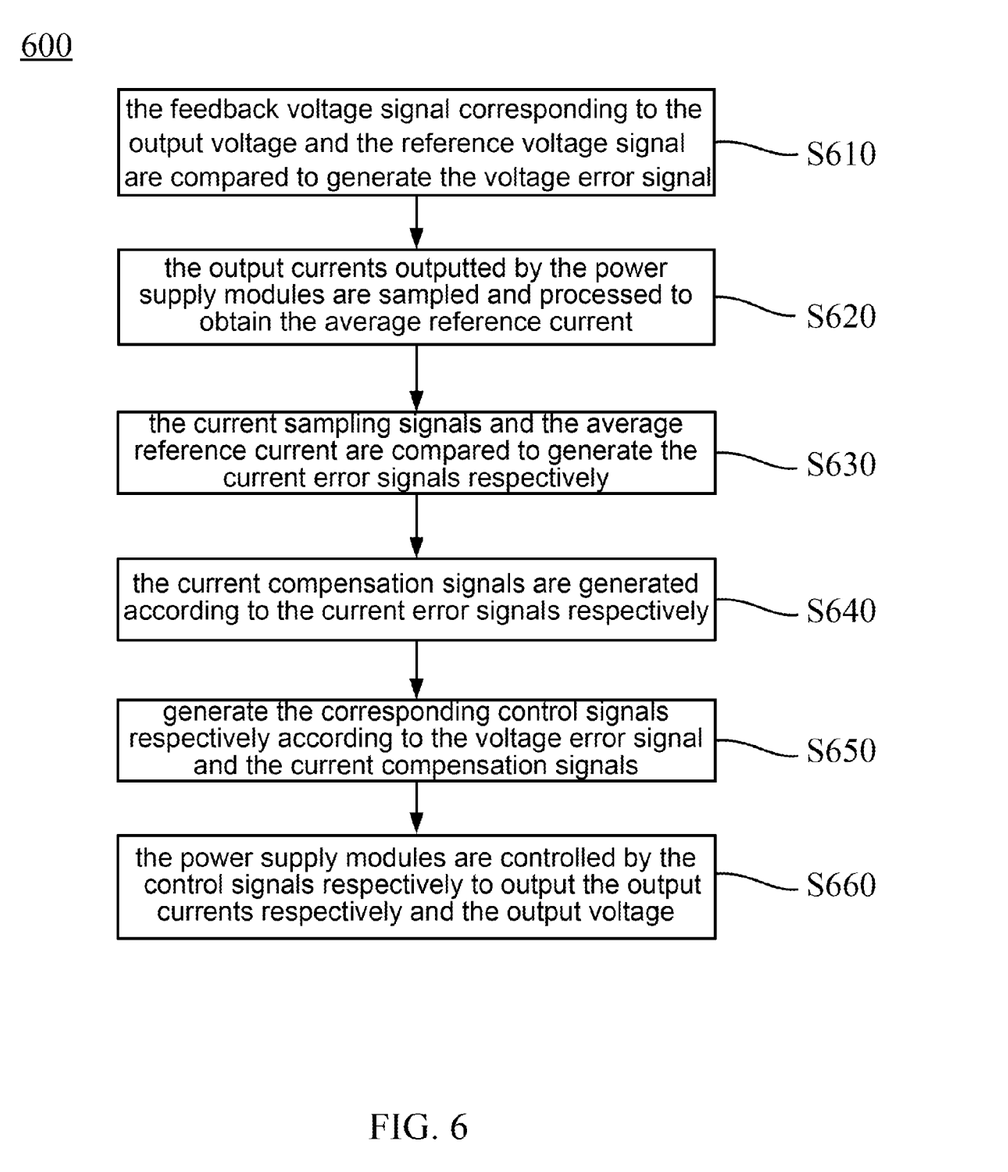
FIG. 6 is a flow chart illustrating a control method according to an embodiment of the present disclosure.

Yet another aspect of the present disclosure is a control method for a power supply device. Reference is made to FIG. 6. FIG. 6 is a flow chart illustrating a control method 600 according to another embodiment of the present disclosure. For convenience and to facilitate a clear description, the embodiment shown in FIG. 4 is taken as an example to describe the method below, but this is not meant to limit the present disclosure.

The control method 600 includes steps S610, S620, S630, S640, S650, S660, and S670. First, in step S610, the feedback voltage signal SIG_vout corresponding to the output voltage Vout and the reference voltage signal Vref are compared to generate the voltage error signal ERR_V.

In step S620, the output currents Ia and Ib outputted by the power supply modules 320 and 340 respectively are sampled, and the output currents Ia and Ib are processed to obtain the average reference current Iavg. In step S630, the current sampling signals SIG_Ia and SIG_Ib corresponding respectively to the output currents Ia and Ib, and the average reference current Iavg are compared to generate the current error signals ERR_Ia and ERR_Ib respectively.

In step S640, the current compensation signals COM_Ia and COM_Ib are generated according to the current error signals ERR_Ia and ERR_Ib respectively. In some embodiments, the current error signals ERR_Ia and ERR_Ib may be outputted directly as the current compensation signals COM_Ia and COM_Ib to achieve this step without other changes or processes. Then, in the step S650, generate the corresponding control signals CMD_a and CMD_b respectively according to the voltage error signal ERR_V and the current compensation signals COM_Ia and COM_Ib.

Finally, in step S660, the power supply modules 320 and 340 are controlled by the control signals CMD_a and CMD_b respectively to output the output currents Ia and Ib respectively and the output voltage Vout.

Since those skilled in the art would be capable of immediately understand how to perform the operations and functions of the method based on the power supply device 300 in the embodiments described above, a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

In summary, according to the embodiments disclosed in the present disclosure, in the present disclosure, by collecting the output currents of the power supply modules and adjusting the control signals after calculation, the current equalization of the power supply modules is achieved in a master-slave control mode or an average-current control mode. Only one voltage loop is required in the control module, and hence, the complexity of the control is simplified.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supply device, comprising:
a master power supply module, configured to output a master output current and an output voltage according to a master control signal;
a slave power supply module, electrically connected in parallel to the master power supply module and configured to output a slave output current and the output voltage according to a slave control signal; and
a control module, electrically connected to the master power supply module and the slave power supply module, and configured to output the master control signal according to the output voltage, generate a current compensation signal according to the master output current and the slave output current, and output the slave control signal according to the output voltage and the current compensation signal;
wherein the current compensation signal is based on the master output current.

2. The power supply device of claim 1, wherein when the slave output current is larger than the master output current, the current compensation signal is configured to adjust the slave control signal to control the slave power supply module to reduce the slave output current, and
when the slave output current is smaller than the master output current, the current compensation signal is configured to adjust the slave control signal to control the slave power supply module to increase the slave output current.

3. The power supply device of claim 1, wherein the control module comprises:
a voltage comparison unit, configured to compare a feedback voltage signal corresponding to the output voltage and a reference voltage signal to output a voltage error signal;
a master control signal generator, electrically connected to the voltage comparison unit and the master power supply module, and configured to generate the master control signal according to the voltage error signal;
a current comparison unit, electrically connected to the master power supply module and the slave power supply module, and configured to compare a master current sampling signal corresponding to the master output current and a slave current sampling signal corresponding to the slave output current to generate a current error signal, and generate the current compensation signal according to the current error signal; and
a slave control signal generator, electrically connected to the voltage comparison unit, the current comparison unit, and the slave power supply module, and configured to generate the slave control signal according to the voltage error signal and the current compensation signal.

4. The power supply device of claim 3, wherein the value of the current error signal and the value of the current compensation signal are the same.

5. The power supply device of claim 3, wherein each of the master control signal and the slave control signal is a pulse width modulation signal,
when the slave output current is larger than the master output current, the current compensation signal is configured to adjust a duty cycle of the slave control signal correspondingly to reduce the slave output current, and
when the slave output current is smaller than the master output current, the current compensation signal is configured to adjust the duty cycle of the slave control signal correspondingly to increase the slave output current.

6. The power supply device of claim 3, wherein the control module comprises a digital signal processor, and the digital signal processor comprises the voltage comparison unit, the master control signal generator, the current comparison unit, and the slave control signal generator.

7. A control method for a power supply device, wherein the power supply device comprises a master power supply module and a slave power supply module electrically connected in parallel, and the control method comprises:
controlling the master power supply module to output a master output current and an output voltage by a master control signal, wherein the master control signal is generated according to the output voltage; and
controlling the slave power supply module to output a slave output current and the output voltage by a slave control signal, wherein the slave control signal is generated according to the output voltage and a current compensation signal, wherein the current compensation signal is generated according to the master output current and the slave output current.

8. The control method of claim 7, further comprising:
when the slave output current is larger than the master output current, the current compensation signal is configured to adjust the slave control signal to control the slave power supply module to reduce the slave output current, and
when the slave output current is smaller than the master output current, the current compensation signal is configured to adjust the slave control signal to control the slave power supply module to increase the slave output current.

9. The control method of claim 7, further comprising:
comparing a feedback voltage signal corresponding to the output voltage and a reference voltage signal to generate a voltage error signal;
generating the master control signal according to the voltage error signal;
comparing a master current sampling signal corresponding to the master output current and a slave current sampling signal corresponding to the slave output current to generate a current error signal, and generating the current compensation signal according to the current error signal; and
generating the slave control signal according to the voltage error signal and the current compensation signal.

10. The control method of claim 9, wherein each of the master control signal and the slave control signal is a pulse width modulation signal, and the control method further comprises:

adjusting a duty cycle of the slave control signal correspondingly to reduce the slave output current when the slave output current is larger than the master output current; and adjusting the duty cycle of the slave control signal correspondingly to increase the slave output current when the slave output current is smaller than the master output current.

11. A power supply device, comprising:

a plurality of power supply modules, wherein the power supply modules are electrically connected in parallel to each other and configured to output an output voltage, and each of the power supply modules is configured to output an output current, and adjust the output current according to a corresponding control signal; and a control module, electrically connected to the power supply modules, configured to obtain an average reference current according to the output currents and generate a plurality of current compensation signals corresponding to the power supply modules based on the average reference current, and output the control signals corresponding to the power supply modules according to the output voltage and the current compensation signals, to adjust the output currents of the power supply modules.

12. The power supply device of claim 11, wherein when the output current of any one of the power supply modules is larger than the average reference current, the corresponding current compensation signal is configured to adjust the corresponding control signal to reduce the output current of the corresponding power supply module, and when the output current of any one of the power supply modules is smaller than the average reference current, the current compensation signal is configured to adjust the corresponding control signal to increase the output current of the corresponding power supply module.

13. The power supply device of claim 11, wherein the control module further comprises:

a voltage comparison unit, configured to compare a feedback voltage signal corresponding to the output voltage and a reference voltage signal to output a voltage error signal;

an average current calculating unit, electrically connected to the power supply modules, and configured to receive a plurality of current sampling signals corresponding to the output currents to generate the average reference current;

a plurality of current comparison units, each electrically connected to the average current calculating unit and electrically connected to a corresponding one of the power supply modules, wherein the current comparison units are configured to compare the corresponding current sampling signals and the average reference current to generate a plurality of current error signals respectively to generate the corresponding current compensation signals; and a plurality of control signal generators, each electrically connected to the voltage comparison unit and electrically connected to a corresponding one of the current comparison units and a corresponding one of the power supply modules, wherein the control signal generators are configured to output the corresponding control signals according to the voltage error signal and the current compensation signals respectively.

14. The power supply device of claim 13, wherein the value of one of the current error signals and the value of the corresponding current compensation signal are the same.

15. The power supply device of claim 13, wherein each of the control signals is a pulse width modulation signal, wherein when the corresponding current sampling signal of any one of the power supply module is larger than the average reference current, the corresponding current compensation signal is configured to adjust a duty cycle of the corresponding control signal to reduce the corresponding output current of the power supply module, and when the corresponding current sampling signal of any one of the power supply module is smaller than the average reference current, the corresponding current compensation signal is configured to adjust the duty cycle of the corresponding control signal to increase the corresponding output current of the power supply module.

16. The power supply device of claim 13, wherein the control module comprises a digital signal processor and the digital signal processor is configured to output the control signals respectively according to the feedback voltage signal and the current sampling signals.

17. A control method for a power supply device, wherein the power supply device comprises a plurality of power supply modules electrically connected in parallel and configured to output an output voltage, and the control method comprises:

sampling a plurality of output currents outputted by the power supply modules, and processing the output currents to obtain an average reference current; and obtaining a corresponding current compensation signal with respect to each power supply module based on the average reference current, and outputting a plurality of control signals corresponding to the power supply modules according to the output voltage and the corresponding current compensation signals.

18. The control method of claim 17, further comprising:

when the output current of any one of the power supply modules is larger than the average reference current, the current compensation signal is configured to adjust the control signal of the corresponding power supply module to reduce the output current, and when the output current of any one of the power supply modules is smaller than the average reference current, the current compensation signal is configured to adjust the control signal of the corresponding power supply module to increase the output current.

19. The control method of claim 17, further comprising:

comparing a feedback voltage signal corresponding to the output voltage and a reference voltage signal to generate a voltage error signal;

comparing a plurality of current sampling signals corresponding respectively to the output currents and the average reference current to generate a plurality of corresponding current error signals, and to generate the current compensation signals according to the corresponding current error signals; and generating the corresponding control signals respectively according to the voltage error signal and the current compensation signals.

20. The control method of claim 19, wherein each of the control signals is a pulse width modulation signal, and the control method further comprises:

adjusting a duty cycle of the corresponding control signal by the corresponding current compensation signal to reduce the output current when any one of the current sampling signals is larger than the average reference current; and adjusting a duty cycle of the corresponding control signal by the corresponding current compensation signal to increase the output current when any one of the current sampling signals is smaller than the average reference current.

\* \* \* \* \*